(12) United States Patent
Varma et al.

(10) Patent No.: US 12,301,933 B2
(45) Date of Patent: May 13, 2025

(54) USER INTERFACE FOR MEDIA CONTENT PLAYBACK

(71) Applicant: Spotify AB, Stockholm (SE)

(72) Inventors: Achal Varma, London (GB); Arjun Shantanu Narayen, San Francisco, CA (US); Katherine Yi-Pin Lin, Boston, MA (US); Björn Håkan Lindberg, Gothenburg (SE); Jason Allen Russell, Prides Crossing, MA (US)

(73) Assignee: Spotify AB, Stockholm (SE)

( * ) Notice: Subject to any disclaimer, the term of this patent is extended or adjusted under 35 U.S.C. 154(b) by 679 days.

(21) Appl. No.: 17/497,681

(22) Filed: Oct. 8, 2021

(65) Prior Publication Data

US 2023/0114681 A1 Apr. 13, 2023

(51) Int. Cl.
| | |
|---|---|
| *H04N 21/442* | (2011.01) |
| *G06N 20/00* | (2019.01) |
| *H04N 21/2668* | (2011.01) |
| *H04N 21/45* | (2011.01) |
| *H04N 21/472* | (2011.01) |

(52) U.S. Cl.
CPC ....... *H04N 21/44222* (2013.01); *G06N 20/00* (2019.01); *H04N 21/2668* (2013.01); *H04N 21/4532* (2013.01); *H04N 21/47217* (2013.01)

(58) Field of Classification Search
CPC ......... H04N 21/44222; H04N 21/2668; H04N 21/4532; H04N 21/47217; G06N 20/00
See application file for complete search history.

(56) References Cited

U.S. PATENT DOCUMENTS

2007/0256021 A1* 11/2007 Prager .................... H04H 60/66
715/744
2016/0196345 A1* 7/2016 Kreifeldt ............... G06F 16/637
707/738

OTHER PUBLICATIONS

Felicioni, Nicolo et al., "A Methodology for the Offline Evaluation of Recommender Systems in a User Interface with Multiple Carousels", In Adjunct Proceedings of the 29th ACM Conference on User Modeling, Adaptation and Personalization (UMAP '21 Adjunct), Jun. 21-25, 2021, 7 pages.
Rhodes, Margaret, "Netflix's Redesign Will Finally Ditch the Slow Carousels", WIRED Magazine, Design, May 25, 2015, 3 pages.

* cited by examiner

*Primary Examiner* — Oschta I Montoya
(74) *Attorney, Agent, or Firm* — Morgan, Lewis & Bockius LLP

(57) ABSTRACT

Systems, devices, apparatuses, components, methods, and techniques for media a simple user interface that can facilitate discovery of contextually relevant media content with minimal navigation are provided. For example, the disclosed user interface may present contextually relevant categories, sub-categories and media content items while concurrently playing a media content item predicted to likely be selected by the user.

20 Claims, 12 Drawing Sheets

USER INTERFACE FOR MEDIA CONTENT PLAYBACK

BACKGROUND

Many people enjoy consuming media content that complements the particular person's current mood, vibe, or activity. The media content can include audio content, video content, or other types of media content. Examples of audio content include songs, albums, podcasts, audiobooks, etc. Examples of video content include movies, music videos, television episodes, etc. Using a mobile phone or other media-playback device a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult for a user to find or select desired media content, or media content that complements the listening context, including the user's mood, vibe, or activity.

SUMMARY

In general terms, this disclosure is directed to an enhanced user interface for efficiently playing media content items. In one possible configuration and by non-limiting example, a media playback device generates a user interface that is specifically configured to enhance selection and playback of media content items that are complementary to the user's current mood, vibe, or activity while minimizing the interactions between the user and the playback device.

In one aspect, a method of presenting one or more media content items to a user is disclosed. For example, the method comprises: identifying a plurality of categories of media content; selecting a subset of the plurality of categories of media content, wherein the subset of the plurality of categories includes one or more categories that are selected for the user based on one or more user preferences; identifying a plurality of subcategories associated with the particular category; selecting a particular subcategory from the plurality of subcategories based on the one or more user preferences; identifying a plurality of media content items associated with the particular subcategory; selecting a particular media content item from the plurality of media content items based on the one or more user preferences; presenting the subset of the plurality of categories in a user interface, including the particular category, for selection by the user; and causing playback of the particular media content item while the subset of the plurality of categories are presented in the user interface.

In another aspect, a non-transitory computer-readable storage device storing data instructions is disclosed. For example, the data instructions, when executed by a processor, cause the processor to: identify a plurality of categories of media content; select a subset of the plurality of categories of media content, wherein the subset of the plurality of categories includes at least one particular category that is selected for the user based on one or more user preferences; identify a plurality of subcategories associated with the particular category; select a particular subcategory from the plurality of subcategories based on the one or more user preferences; identify a plurality of media content items associated with the particular subcategory; selecting a particular media content item from the plurality of media content items based on the one or more user preferences; presenting the subset of the plurality of categories in a user interface, including the particular category, for selection by the user; cause the playback of the particular media content item while the subset of the plurality of categories are presented in the user interface.

In yet another aspect, a media playback device is disclosed. For example, the media playback device comprises: an audio output device for media playback; a touch-sensitive display; a processor; a computer-readable storage device storing data instructions, which when executed by the processor, cause the processor to: receive, from a media content server application, data associated with a plurality of categories, a plurality of subset of categories, a plurality of media content items and a first media content item, the plurality of categories, the plurality of subset of categories, the plurality of media content items and the first media content item are identified to align with the user's preferences; generate a user interface screen for display on the touch-sensitive display of the media playback device; concurrently cause the display of a plurality of category cards on the user interface screen and begin automatic playback of the first media content item, wherein the display of the plurality of category cards is based on the data associated with the plurality of categories; receive a first user selection of one of the plurality of category cards; cause the display of a plurality of sub-category cards on the user interface, wherein the display of the plurality of sub-category cards is based on the data associated with the plurality of subset of categories; receive a second user selection of one of the plurality of sub-category cards from the user; cause the display of a listing of a plurality of media content items, wherein the listing of the plurality of media content items is based on the data associated with the plurality of media content items; receive a third user selection of a second media content item; and end playback of the first media content item and begin playback of the second media content item.

DETAILED DESCRIPTION

Figure 1:
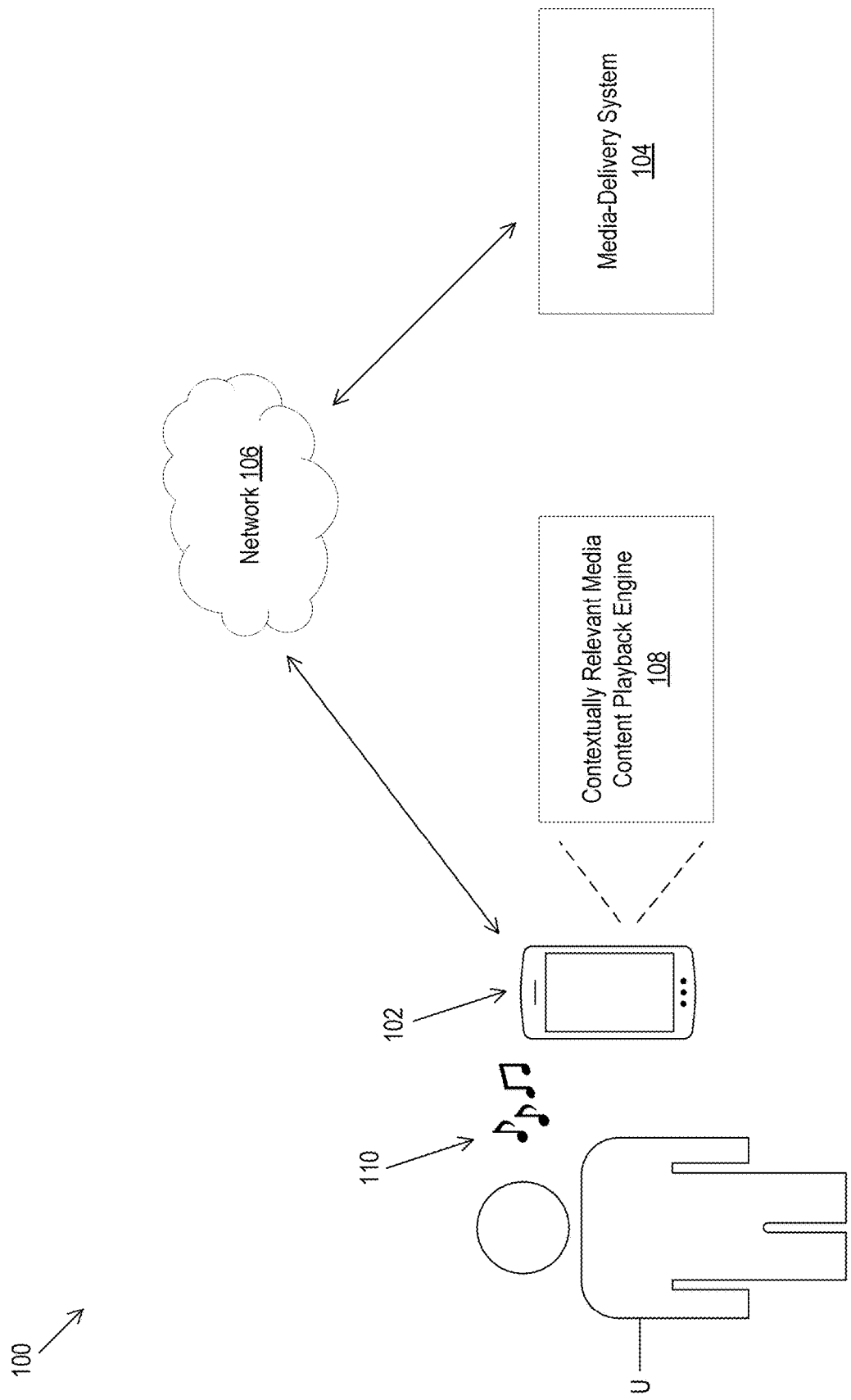
FIG. 1 illustrates an example media playback system for playback of contextually relevant media content.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

New users to a music platform find it harder to find content. Typically, users have to go through multiple levels of selections and navigations before finding content they are looking for. Users typically do not like navigating backwards once they make a selection. Further, users face decision paralysis when presented with a large number of choices.

A simple user interface that can facilitate discovery of contextually relevant media content with minimal navigation will improve user satisfaction and increase active usage/subscriptions.

Users can typically express the context of their desired media item in terms of broad categories such as mood (e.g., "relaxing music", "party music", etc.), energy level (e.g., high/low), or genre (e.g., jazz, classical, country) but may have difficulty naming specific playlists, artists, or albums. When users are presented with a large number of media content choices, they feel overwhelmed and have difficulty choosing between similar tracks or playlists. But even when a user is presented with categories of media content to choose from, the user can still be unsure of whether it is the type of music that is desired.

The disclosed user interface aims to improve user perception of such categories by presenting them in a more interactive manner, highlighting the relevant attributes (such as listening context, including the energy, vibe, etc.) using audio/visual cues. The disclosed user interface also allows users to arrive at contextually relevant playlists that are curated for the user with minimal number of user selections.

In some examples, the disclosed user interface may present the user with a plurality of category cards, that each represent a particular category of music. For example, each category of music may be related to a listening context, including the genre, mood, vibe, energy level, activity, or be otherwise distinct. Upon selection of one of the categories, a plurality of sub-category cards, each of the plurality of sub-category cards related to the selected category, is displayed on the user interface. Upon selection of one of the sub-categories, a plurality of media content items related to the selected sub-category is displayed on the user interface. In some examples, each of the plurality of categories, sub-categories and media content items are curated for the user based on the user's preferences.

In some examples, the display of the category cards on the user interface is accompanied by a playback of a music track. The selection of the music track may be based on a prediction of what category, sub-category and media content item the user is likely to select based on a plurality of factors including user preferences such as: the user's taste preferences, listening history, selection history and user feedback. Other factors may also be considered when making the selection.

In some other examples, each of the category cards and sub-category cards may include a video snippet that may automatically play as the user scrolls through each of the cards. The video snippet is associated with the category or sub-category and is used to provide the user with the vibe, mood or energy associated with the category or sub-category. The video snippets allow the user to instantly recognize and get a feel for the type of media content that are included within the category or sub-category. Thus, the user need not sample one or more media content items from a sub-category before understanding the context of the media content items.

For example, for a category named "dinner," the associated video snippet may include a person setting a table for dinner and for a sub-category named "Italian dinner," the associated video snippet may include a person making pasta. In some examples, the video snippet may be personalized to the preferences of the user. For example, a user may prefer a video of friends enjoying a dinner party associated with to category named "dinner" rather than a person preparing dinner. The user may be able to select one of several options to personalize the video snippet, or even upload their own video snippet.

FIG. 1 illustrates an example media playback device 100 for playback of contextually relevant media content. The example media playback device 100 includes a media playback device 102 and a media-delivery system 104. The media playback device 102 includes a contextually relevant media content playback engine 108. The media playback device 100 communicates across a network 106. Also shown, is a user U who is using the media playback device 102 to consume media content.

The media playback device 102 plays back media content items to produce media output 110. In some embodiments, the media content items are provided by the media-delivery system 104 and transmitted to the media playback device 102 using the network 106. A media content item is an item of media content, including audio, video, or other types of media content, which may be stored in any format suitable for storing media content. Non-limiting examples of media content items include songs, albums, audiobooks, music videos, movies, television episodes, podcasts, other types of audio or video content, and portions or combinations thereof.

The media playback device 102 plays media content for the user. The media content that is played back may be selected based on user input or may be selected without user input. The media content may be selected for playback without user input by either the media playback device 102 or the media-delivery system 104. For example, media content can be selected for playback without user input based on user preferences, playback history, selection history, time of day, and other criteria. User profile information includes but is not limited to user preferences and historical information about the user's consumption of media content. User profile information can also include libraries and/or playlists of media content items associated with the user. User profile information can also include information about the user's relationships with other users (e.g., associations between users that are stored by the media-delivery system 104 or on a separate social media site). Where user data is used, it can be handled according to a defined user privacy policy and can be used to the extent allowed by the user. Where the data of other users is used, it can be handled in an anonymized manner so the user does not learn of the details of other users generally or specifically. Although the media playback device 102 is shown as a separate device in FIG. 1, the media playback device 102 can also be integrated with a vehicle (e.g., as part of a dash-mounted vehicle infotainment system) or another device.

The contextually relevant media content playback engine 108 generates interfaces for selecting and playing back media content items. In at least some embodiments, the contextually relevant media content playback engine 108 generates interfaces that include a set of cards, each card associated with a category of media content items. In some examples, the set of category cards are curated based on the user's preferences. In some examples, upon selection of a category card by a user, the user interface may display a plurality of cards, each associated with a sub-category of the selected category. In some examples, upon selection of a sub-category card by a user, the user interface may display one or more media content items associated with the selected sub-category.

In some examples, the display of the set of cards on the user interface is accompanied by the playback of a media content item that is predicted to be the media content item that the user is likely to select. Embodiments of the contextually relevant media content playback engine 108 are illustrated and described further throughout.

Figure 2:
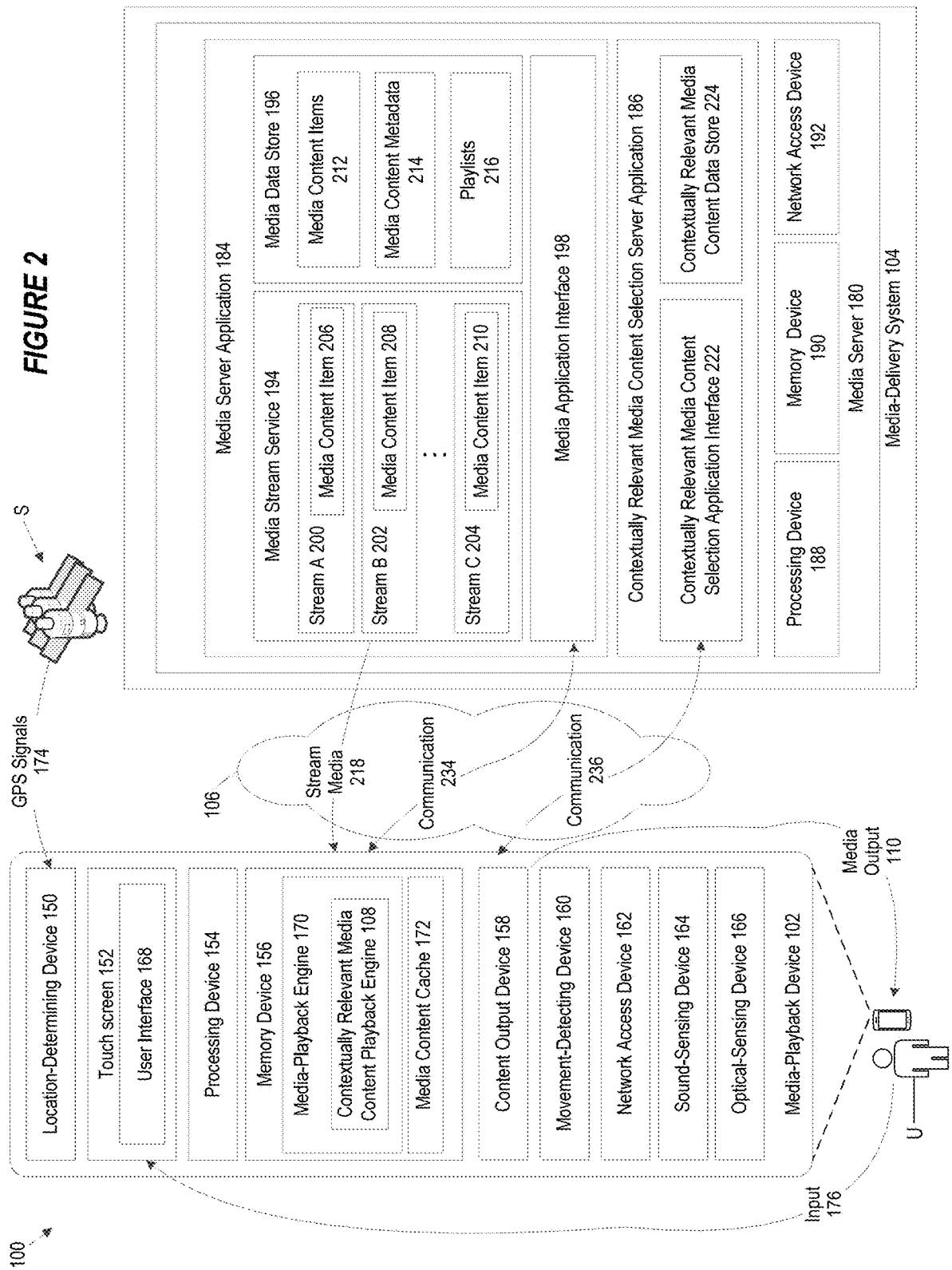
FIG. 2 illustrates an example system for contextually relevant media content playback.

FIG. 2 is a schematic illustration of an example media playback device 100 for contextually relevant media content playback. In FIG. 2, the media playback device 102, the media-delivery system 104, and the network 106 are shown. Also shown are the user U and satellites S.

As noted above, the media playback device 102 plays media content items. In some embodiments, the media playback device 102 plays media content items that are provided (e.g., streamed, transmitted, etc.) by a system external to the media-playback device such as the media-delivery system 104, another system, or a peer device. Alternatively, in some embodiments, the media playback device 102 plays media content items stored locally on the media playback device 102. Further, in at least some embodiments, the media playback device 102 plays media content items that are stored locally as well as media content items provided by other systems.

In some embodiments, the media playback device 102 is a computing device, handheld entertainment device, smartphone, tablet, watch, wearable device, or any other type of device capable of playing media content. In yet other embodiments, the media playback device 102 is an in-dash vehicle computer, laptop computer, desktop computer, television, gaming console, set-top box, network appliance, blu-ray or DVD player, media player, stereo, or radio.

In at least some embodiments, the media playback device 102 includes a location-determining device 150, a touch screen 152, a processing device 154, a memory device 156, a content output device 158, a movement-detecting device 160, a network access device 162, a sound-sensing device 164, and an optical-sensing device 166. Other embodiments may include additional, different, or fewer components. For example, some embodiments do not include one or more of the location-determining device 150, the touch screen 152, the sound-sensing device 164, and the optical-sensing device 166.

The location-determining device 150 is a device that determines the location of the media playback device 102. In some embodiments, the location-determining device 150 uses one or more of the following technologies: Global Positioning System (GPS) technology which may receive GPS signals 174 from satellites S, cellular triangulation technology, network-based location identification technology, Wi-Fi positioning systems technology, and combinations thereof.

The touch screen 152 operates to receive an input 176 from a selector (e.g., a finger, stylus, etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 168 for interacting with the media playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media playback engine 170 that includes the contextually relevant media content playback engine 108. In some embodiments, the media playback engine 170 selects and plays back media content and generates interfaces for selecting and playing back media content items. As described above, the contextually relevant media content playback engine 108 also generates interfaces for selecting and playing back media content items.

In at least some embodiments, the contextually relevant media content playback engine 108 generates interfaces that are configured to provide contextually relevant media content for user consumption with minimal number of interactions and selections between the user and the media playback device 102. For example, interfaces generated by the contextually relevant media content playback engine 108 may include fewer levels of selections and audio/visual cues that enable users to arrive at contextually relevant media content items more efficiently than other interfaces generated by the media playback engine 170.

Some embodiments of the memory device also include a media content cache 172. The media content cache 172 stores media content items, such as media content items that have been previously received from the media-delivery system 104. The media content items stored in the media content cache 172 may be stored in an encrypted or unencrypted format. The media content cache 172 can also store decryption keys for some or all of the media content items that are stored in an encrypted format. The media content cache 172 can also store metadata about media content items such as title, artist name, album name, length, genre, mood, era, etc. The media content cache 172 can also store playback information about the media content items, such as the number of times the user has requested to playback the media content item or the current location of playback (e.g., when the media content item is an audiobook, podcast, or the like for which a user may wish to resume playback).

The memory device 156 typically includes at least some form of computer-readable media. Computer readable media includes any available media that can be accessed by the media playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blu-ray discs, digital versatile discs or other optical storage, magnetic cassettes, magnetic tape, magnetic disk storage or other magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker assembly comprising one or more speakers, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones, speaker system, or vehicle head unit.

The movement-detecting device 160 senses movement of the media playback device 102. In some embodiments, the movement-detecting device 160 also determines an orientation of the media playback device 102. In at least some embodiments, the movement-detecting device 160 includes one or more accelerometers or other motion-detecting technologies or orientation-detecting technologies. As an example, the movement-detecting device 160 may determine an orientation of the media playback device 102 with respect to a primary direction of gravitational acceleration. The movement-detecting device 160 may detect changes in the determined orientation and interpret those changes as indicating movement of the media playback device 102. The movement-detecting device 160 may also detect other types of acceleration of the media-playback device and interpret those acceleration as indicating movement of the media playback device 102 too.

The network access device 162 operates to communicate with other computing devices over one or more networks, such as the network 106. Examples of the network access device include one or more wired network interfaces and wireless network interfaces. Examples of wireless network interfaces include infrared, BLUETOOTH® wireless technology, 802.11a/b/g/n/ac, and cellular or other radio frequency interfaces.

The network 106 is an electronic communication network that facilitates communication between the media playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more vehicle area networks, local area networks (LANs), metropolitan area networks, subnets, wide area networks (such as the Internet), or can be implemented at another scale. Further, in some embodiments, the network 106 includes multiple networks, which may be of the same type or of multiple different types.

The sound-sensing device 164 senses sounds proximate to the media playback device 102 (e.g., sounds within a vehicle in which the media playback device 102 is located). In some embodiments, the sound-sensing device 164 comprises one or more microphones. For example, the sound-sensing device 164 may capture a recording of sounds proximate to the media playback device 102. These recordings may be analyzed by the media playback device 102 using speech-recognition technology to identify words spoken by the user. The words may be recognized as commands from the user that alter the behavior of the media playback device 102 and the playback of media content by the media playback device 102. The words and/or recordings may also be analyzed by the media playback device 102 using natural language processing and/or intent-recognition technology to determine appropriate actions to take based on the spoken words. Additionally or alternatively, the sound-sensing device may determine various sound properties about the sounds proximate the user such as volume, dominant frequency or frequencies, etc. These sound properties may be used to make inferences about the environment proximate to the media playback device 102 such as whether the sensed sounds are likely to correspond to a private vehicle, public transportation, etc. In some embodiments, recordings captured by the sound-sensing device 164 are transmitted to media-delivery system 104 (or another external server) for analysis using speech-recognition and/or intent-recognition technologies.

The optical-sensing device 166 senses optical signals proximate the media playback device 102. In some embodiments, the optical-sensing device 166 comprises one or more light sensors or cameras. For example, the optical-sensing device 166 may capture images or videos. The captured images can be processed (by the media playback device 102 or an external server such as the media-delivery system 104 to which the images are transmitted) to detect gestures, which may then be interpreted as commands to change the playback of media content. Similarly, a light sensor can be used to determine various properties of the environment proximate to the user computing device, such as the brightness and primary frequency (or color or warmth) of the light in the environment proximate to the media playback device 102. These properties of the sensed light may then be used to infer whether the media playback device 102 is in an indoor environment, an outdoor environment, a private vehicle, public transit, etc.

The media-delivery system 104 comprises one or more computing devices and provides media content items to the media playback device 102 and, in some embodiments, other media-playback devices as well. The media-delivery system 104 includes a media server 180. Although FIG. 2 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 180 transmits stream media 218 to media-playback devices such as the media playback device 102. In some embodiments, the media server 180 includes a media server application 184, a contextually relevant media content selection server application 186, a processing device 188, a memory device 190, and a network access device 192. The processing device 188, memory device 190, and network access device 192 may be similar to the processing device 154, memory device 156, and network access device 162 respectively, which have each been previously described.

In some embodiments, the media server application 184 streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media playback engine 170.

In some embodiments, the media data store 196 stores media content items 212, media content metadata 214, and playlists 216. The media data store 196 may comprise one or more databases and file systems. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The contextually relevant media content selection server application 186 provides functionality for providing media content items and interfaces for accessing media content items to media-playback devices. In some embodiments, the contextually relevant media content selection server application 186 includes a contextually relevant media content selection application interface 222 and a contextually relevant media content data store 224.

The contextually relevant media content selection application interface 222 can receive requests or other communication from media-playback devices or other systems, to retrieve context information and media content items for playback. For example, in FIG. 2, the contextually relevant media content selection application interface 222 receives communication 236 from the media playback engine 170.

The contextually relevant media content selection application interface 222 can also generate interfaces that are transmitted to the media playback device 102 for use by the contextually relevant media content playback engine 108.

Additionally, the contextually relevant media content selection server application 186 can process data and user input information received from the media playback device 102. In some embodiments, contextually relevant media content selection server application 186 operates to transmit information about the suitability of one or more media content items for playback. In some embodiments, the contextually relevant media content selection server application 186 may provide a list of media content items that are suited to the listening context, including the particular moods, vibes, energy levels, activities, social contexts, etc.

For example, the contextually relevant media content selection server application 186 may store metadata and other information that associates media content items with listening context, including the moods, vibes, activities, energy levels, social contexts, etc. in the contextually relevant media content data store 224. The contextually relevant media content selection server application 186 may also store information that associates media content items with an individual or group of users' preferences for consuming that media content in the contextually relevant media content data store 224. The contextually relevant media content data store 224 may comprise one or more files or databases. The contextually relevant media content data store 224 can also comprise files, tables, or fields in the media data store 196.

In some embodiments, the contextually relevant media content data store 224 stores contextually relevant media metadata. The contextually relevant media metadata may include various types of information associated with media content items, such as the media content items 212. In some embodiments, the contextually relevant media content data store 224 provides information that may be useful for selecting media content items for playback. For example, in some embodiments, the contextually relevant media content data store 224 stores contextual scores for media content items that correspond to the suitability of particular media content items for playback during particular contexts. As another example, in some embodiments, the contextually relevant media content data store 224 stores timestamps (e.g., start and end points) that identify portions of media content items that are particularly well-suited for playback during particular contexts.

Each of the media playback device 102 and the media-delivery system 104 can include additional physical computer or hardware resources. In at least some embodiments, the media playback device 102 communicates with the media-delivery system 104 via the network 106.

Although in FIG. 2 only a single media playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for contextually relevant media content playback, other embodiments are possible as well. For example, in some embodiments, the media playback device 102 includes a media data store 196 and the media playback device 102 is configured to select and playback media content items without accessing the media-delivery system 104. Further in some embodiments, the media playback device 102 operates to store previously streamed media content items in a local media data store (e.g., the media content cache 172).

In at least some embodiments, the media-delivery system 104 can be used to stream, progressively download, or otherwise communicate music, other audio, video, or other forms of media content items to the media playback device 102 for playback on the media playback device 102. In accordance with an embodiment, a user U can direct the input 176 to the user interface 168 to issue requests, for example, to playback media content for playback during particular situations or in particular contexts on the media playback device 102.

Figure 3:
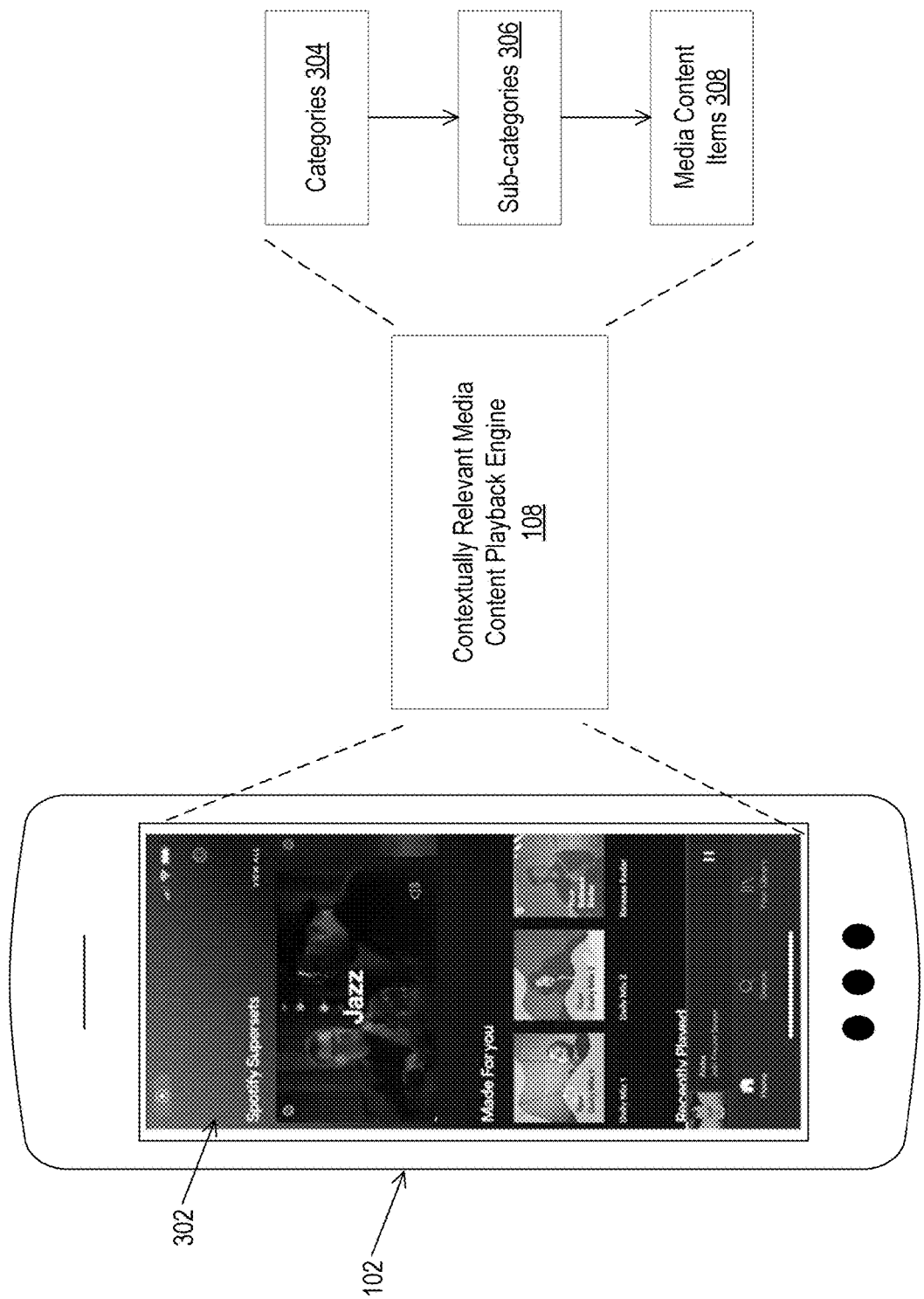
FIG. 3 illustrates an example configuration of the contextually relevant media content playback engine.

FIG. 3 illustrates an example configuration of the contextually relevant media content playback engine 108. The contextually relevant media content playback engine 108 generates interface 302 for selecting and playing back media content items. The interface 302 is displayed on the media playback device 102.

In some examples, the interface 302 is generated by the contextually relevant media content playback engine 108, wherein the interface 302 is organized by levels, including a level for categories 304, a level for sub-categories 306 and a level for media content items 308. In some examples, when the user makes a selection, the interface 302 may transition from one level to the next. The interface 302 and levels of organization of the media content items are described in greater detail in association with FIG. 4.

Figure 4:
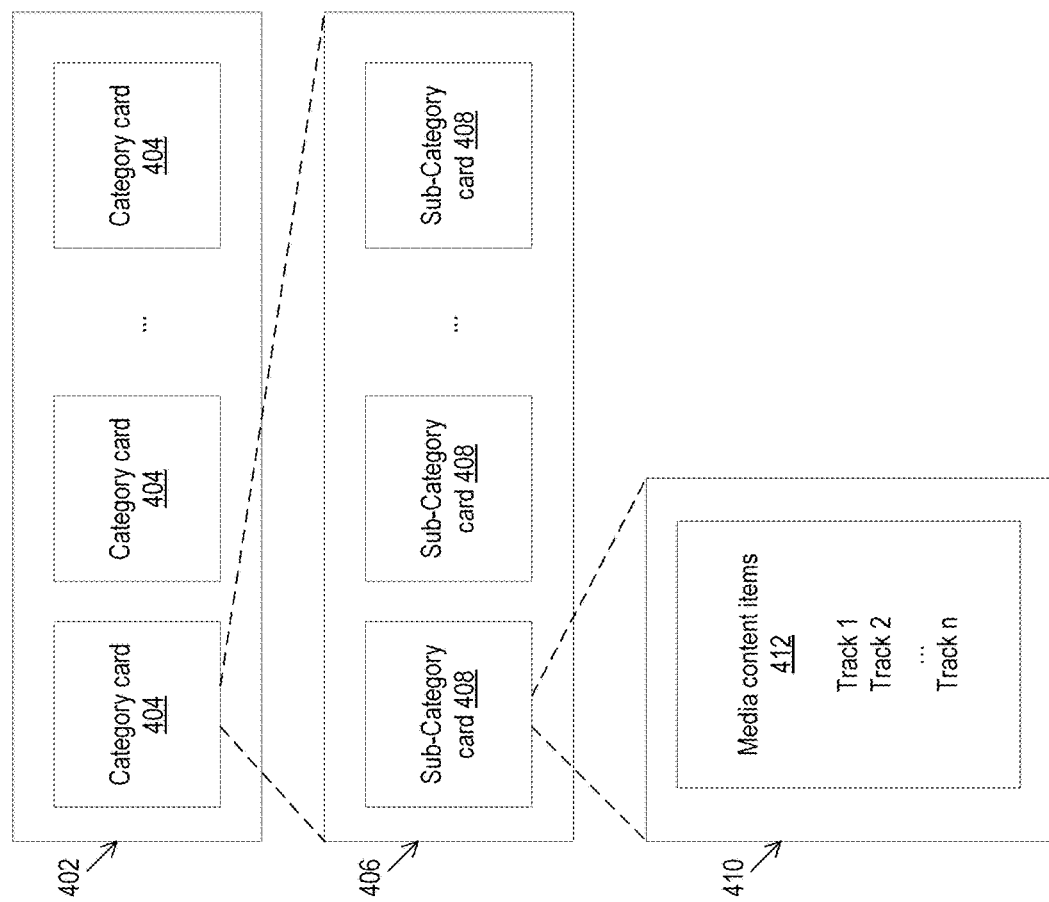
FIG. 4 illustrates another example configuration of the contextually relevant media content playback engine.

FIG. 4 illustrates another example configuration of the contextually relevant media content playback engine 108. The contextually relevant media content playback engine 108 is configured to generate interface 402. The interface 402 is generated based on communication 236 received from the contextually relevant media content selection application interface 222. In some examples, the interface 402 may display a plurality of category cards 404, each card associated with the categories 304 of media content items. In some examples, each of the category cards 404 may be associated with a listening context, such as a mood, vibe, activity or energy level. In other examples, the media content items may be grouped into categories based on other types of contextual elements as well.

In some examples, the user selecting one of the plurality of category cards 404 on interface 402 may cause the contextually relevant media content playback engine 108 to generate interface 406. In some examples, interface 406 may include a plurality of sub-category cards 408. Each of the sub-category cards 408 may be associated with the sub-categories 306 of media content items wherein, the sub-categories are all associated with the selected category card from the plurality of category cards 404 and may be a secondary form of classifying media content items that are primarily classified under a category associated with the selected category card from the plurality of category cards 404.

In one example, a broad category of "Dinner" may be further classified into several sub-categories such as "Italian Dinner," "Cocktail Hour" "Mellow" or "Dinnertime Jazz." Other types of sub-categories within the broader category of "Dinner" is also possible.

In some examples, the user selecting one of the plurality of sub-category cards 408 on interface 406 may cause the contextually relevant media content playback engine 108 to generate interface 410. In some examples, interface 410 may include a plurality of media content items 412. In some examples, the media content items 412 may include music tracks, audio/visual tracks, audio or video snippets and clips. Other types of media content items are also possible. In some examples, the user selecting one of the plurality of media content items 412 may cause the playback of the selected media content item. The generation of the plurality of category cards 404, sub-category cards 408, media content items 412 and playback of media content items are further described in relation to FIGS. 5-9.

Figure 5:
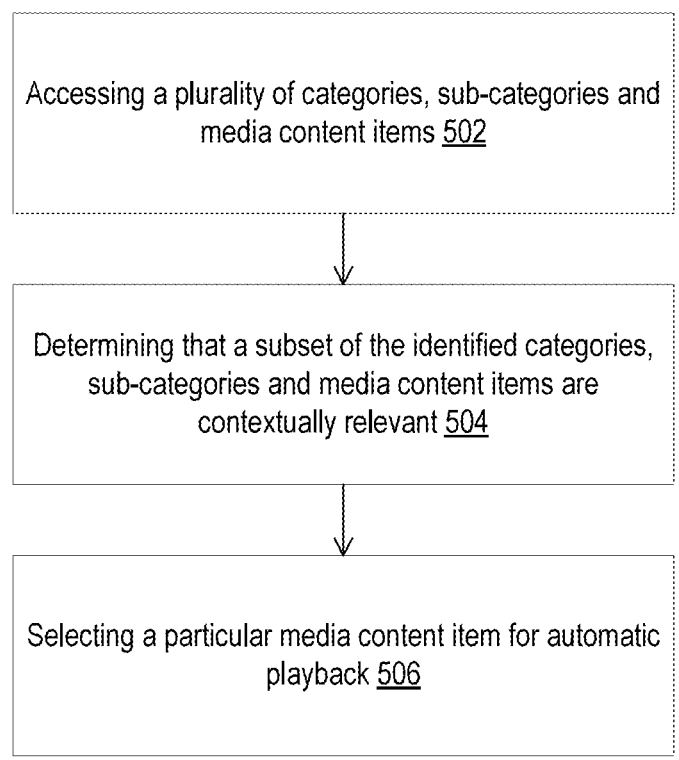
FIG. 5 illustrates an example method of selecting contextually relevant media content items by some embodiments of the contextually relevant media content selection server application.

FIG. 5 illustrates an example method of selecting contextually relevant media content items by some embodiments of the contextually relevant media content selection server application 186.

At operation 502, the contextually relevant media content selection server application 186 accesses a plurality of categories, sub-categories and media content items that are stored in the media data store 196. For example, the media data store 196 may include a catalog of millions of media content items. The catalog of media content items may be stored based on a categorization system that may include thousands of categories and sub-categories. The categorization of the catalog of media content items may be done based on not only artists, albums, genres, release date, etc. but also based on the listening context, including the vibes, moods, beat, activities that the media content item would complement, energy level, etc.

In some examples, the catalog of media content items may be pre-categorized into categories and sub-categories. In one example, the category and sub-category of each media content item may be added as a component of the media content metadata 214 associated with each media content item. Other ways of tagging a media content item to particular categories and sub-categories are also possible.

At operation 504, the contextually relevant media content selection server application 186 determines that a subset of the identified categories, sub-categories and media content items are contextually relevant. For example, among the millions of media content items stored in the media data store 196, a particular user may only be interested in consuming a small subset of the media content items. Based on the user's taste profile, the contextually relevant media content selection server application 186 may determine which of the plurality of categories, sub-categories and media content items stored in the media data store 196 are relevant to the user and the current context. Data associated with the determined subset of categories, sub-categories and media content items may be stored in the contextually relevant media content data store 224. In some examples, the data may include an identifier associated with the determined subset of categories, sub-categories and media content items. In other examples, other types of data associated with the determined subset of categories, sub-categories and media content items can also be stored in the contextually relevant media content data store 224. The contextually relevant media content selection application interface 222 may send the data associated with the subset of categories, sub-categories and media content items to the contextually relevant media content playback engine 108 of the media playback device 102, where the data may be used to generate category, sub-category cards and media content item lists for display on the user interface.

At operation 506, the contextually relevant media content selection server application 186 selects a particular media content item for automatic playback on the media playback device 102. For example, in addition to generating a simpler user interface for playback of media content where the user makes minimal number of selections before arriving at contextually relevant media content, the contextually relevant media content playback engine 108 also causes the automatic playback of a media content item while the generated interface is displayed on the media playback device 102. In some examples, the media content item may be selected specifically for the user based on a prediction of what the user is likely to play as soon as launching the interface. The selected media content item may be played on the media playback device 102 until the user pauses or stops the playback of the media content item or the user navigates the generated interface and selects another media content item for playback.

Figure 6:
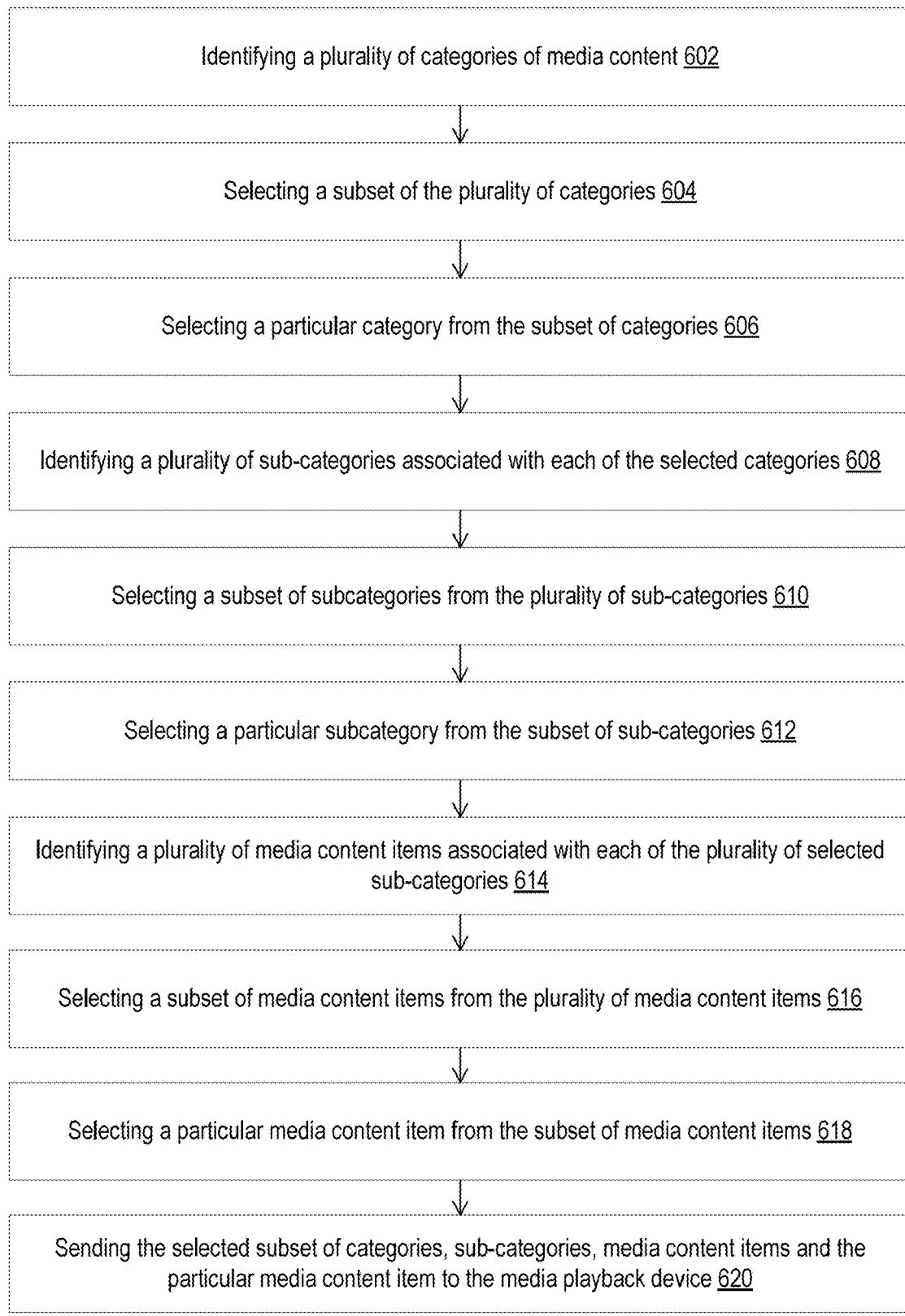
FIG. 6 illustrates another example method of selecting contextually relevant media content items by some embodiments of the contextually relevant media content selection server application.
Figure 7:
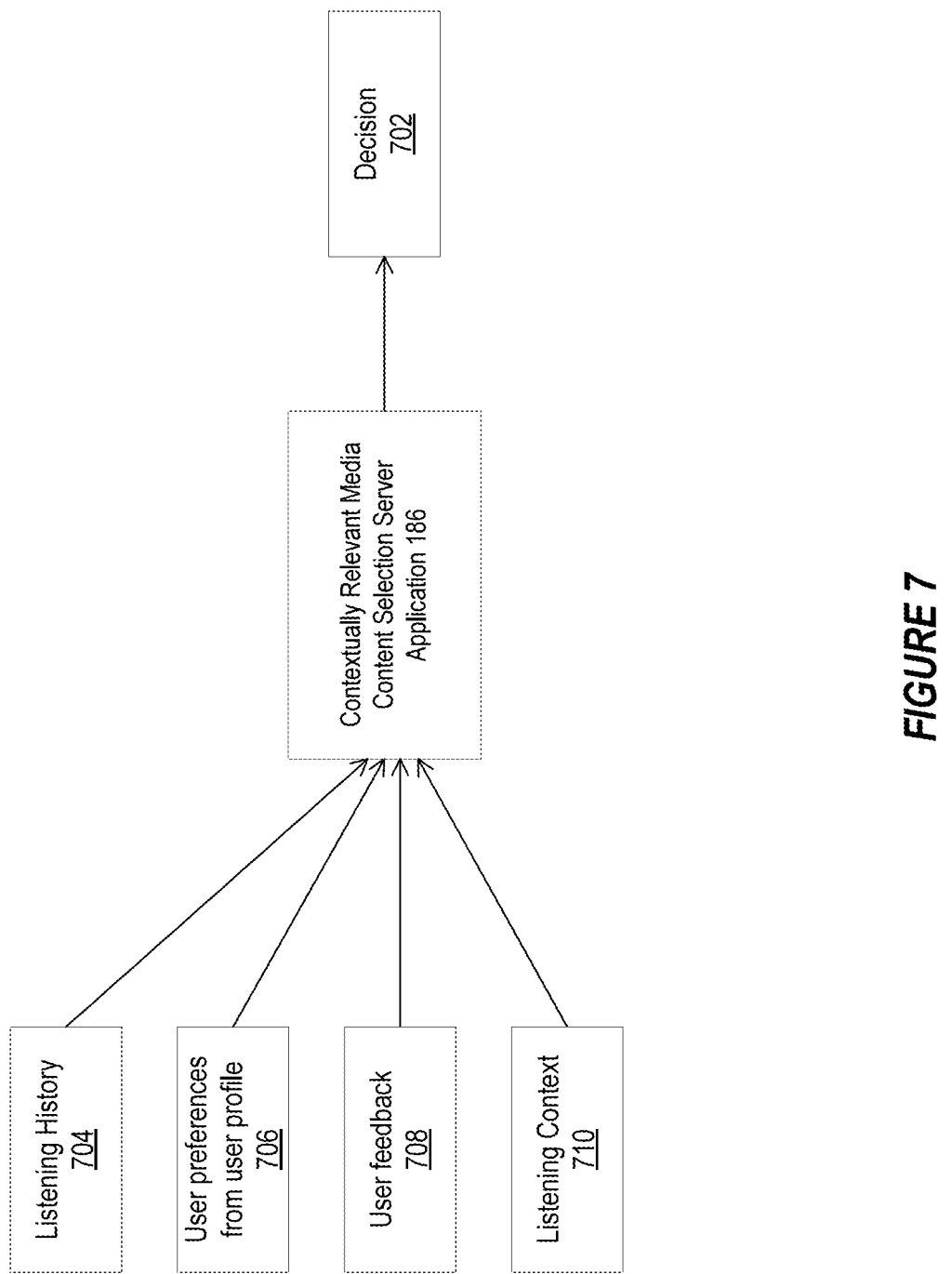
FIG. 7 illustrates an example process used to determine contextually relevant media content.

The method of selecting the subset of categories, sub-categories, media content items and the method of selecting the particular media content item that will be automatically played during the display of interface on the media playback device 102 are described in further detail in relation to FIGS. 6-7.

FIG. 6 illustrates another example method of selecting contextually relevant media content items by some embodiments of the contextually relevant media content selection server application 186.

At operation 602, the contextually relevant media content selection server application 186 may identify a plurality of categories of media content. For example, the contextually relevant media content selection server application 186 may access the media data store 196 to identify categories of media content items.

At operation 604, the contextually relevant media content selection server application 186 may select a subset of the plurality of categories. For example, the contextually relevant media content selection server application 186 may determine based on various factors, such as that are further described in detail in relation to FIG. 7, that the user is likely to consume media content associated with only a subset of categories. Based on this determination, the contextually relevant media content selection server application 186 may select a subset of the plurality of categories.

At operation 606, the contextually relevant media content selection server application 186 may select a particular category among the selected subset of categories that the contextually relevant media content selection server application 186 predicts to be the category the user is likely to select from among the subset of categories. The selection of a particular category among the selected subset of categories may also be based on the various factors described in detail in relation to FIG. 6.

At operation 608, the contextually relevant media content selection server application 186 may identify a plurality of sub-categories associated with each of the selected categories. For example, the contextually relevant media content selection server application 186 may access the media data store 196 to identify a plurality of sub-categories associated with each of the selected subset of categories from operation 604.

At operation 610, the contextually relevant media content selection server application 186 may select a subset of sub-categories for each of the selected categories from the plurality of sub-categories identified in operation 608. For example, the contextually relevant media content selection server application 186 may determine based on various factors, such as that are further described in detail in relation to FIG. 7, that the user is likely to consume media content associated with only a subset of sub-categories. Based on this determination, the contextually relevant media content selection server application 186 may select a subset of the plurality of sub-categories.

At operation 612, the contextually relevant media content selection server application 186 may select a particular sub-category among the selected subset of sub-categories for the particular category that was selected in operation 606. The particular sub-category may be selected based on what the contextually relevant media content selection server application 186 predicts to be the sub-category the user is likely to select from among the subset of sub-categories for the particular category from operation 606. The selection of a particular sub-category among the selected subset of sub-categories may also be based on the various factors described in detail in relation to FIG. 7.

At operation 614, the contextually relevant media content selection server application 186 may identify a plurality of media content items associated with each of the selected sub-categories. For example, the contextually relevant media content selection server application 186 may access the media data store 196 to identify a plurality of media content items associated with each of the selected subset of sub-categories from operation 610.

At operation 616, the contextually relevant media content selection server application 186 may select a subset of media content items for each of the selected sub-categories from each of the selected categories identified in operations 604 and 610. For example, the contextually relevant media content selection server application 186 may determine based on various factors, such as those further described in detail in relation to FIG. 7, that the user is likely to consume only a subset of the media content items from each of the selected sub-categories for each of the selected categories. Based on this determination, the contextually relevant media content selection server application 186 may select a subset of the plurality of media content items identified in operation 614.

At operation 618, the contextually relevant media content selection server application 186 may select a particular media content item from among the selected subset of media content items for the particular sub-category that was selected in operation 612. The particular media content item may be selected based on what the contextually relevant media content selection server application 186 predicts to be the media content item the user is likely to select from among the subset of media content items for the particular sub-category and particular category from operations 606 and 612. The selection of a particular media content item among the selected subset of media content items may also be based on the various factors described in detail in relation to FIG. 7.

At operation 620, the contextually relevant media content selection application interface 222 may send data associated with the selected subset of categories from operation 604, the selected subset of sub-categories from operation 610, the selected subset of media content items from operation 616 as well as data the selected particular media content item from operation 618 to the media playback device 102 through communication 263 over the network 106. The contextually relevant media content playback engine 108 of the media playback device 102 may use the data received in communication 236 from the contextually relevant media content selection application interface 222 to generate interfaces 402, 406, 410, described in further detail above in relation to FIG. 4. The contextually relevant media content playback engine 108 of the media playback device 102 may also cause the automatic playback of the selected particular media content item from operation 618 on the media playback device 102 until the user chooses to select a different media content item. An example method associated with the playback of media content items on the media playback device 102 is described further in relation to FIGS. 8 and 9.

FIG. 7 is a schematic illustration of an example process used to determine contextually relevant media content.

As described above in relation to FIGS. 5-6, the contextually relevant media content selection server application 186 selects a subset of categories, sub-categories and media content items for display on the media playback device 102, as well as a particular media content item for automatic playback on the media playback device 102. In some examples, contextually relevant media content selection server application 186 may include a machine learning model that can be used to make the determination of whether a media content item is contextually relevant to a particular user.

The decision 702 regarding the selection of subset of categories, sub-categories and media content items and the selection of a particular media content item can be based on a plurality of factors. For example, a list of factors driving the decision 702 can include but are not limited to: listening history of the user 704, user preferences based on user profile 706, user feedback 708, and listening context 710. Other types of factors may also be used in determining the decision 702.

In some examples, the listening history of the user 704 may include a historical list of all media content items played by the user over a period of time. The period of time may include several days, weeks, months, years, or a lifetime. For example, the historical list may include data associated with each of the media content items on the list, including any identifiers associated with the media content item, the category and sub-category associated with the media content item, the time of day the media content item was played and the location where the media content item was played. The historical list may also include data regarding the sequence in which media content items were played. Other types of data associated with each of the media content items in the list of media content items associated with the user's listening history may also be used in making the decision 702.

In some examples, the user preferences from user profile 706 may include one or more preferences that the user has selected on the user's account settings. For example, the user account settings may include user profile options where the user may select the genres, artists, vibes, moods, energy levels, etc. that the user typically prefers. In some examples, the user may also be able to select genres, artists, vibes, moods, energy levels, etc. that the user dislikes. In other examples, the user may also be able to select the type of activities the user generally engages in while listening to media content.

For example, the user may use the account settings to select one or more options to indicate that the user has a preference for jazz music, music with a relaxing vibe, generally listening to music while cooking/eating dinner and commuting. The user may also use the account settings to select one or more options to indicate that the user dislikes country music. Based on the user's account settings, the machine learning model may select "Dinner Music" and "Dinner time Jazz" as one of the subset of categories and sub-categories, while eliminating the "Country Music" category and "Truck-driving country music" sub-category.

In some examples, the user feedback 708 may include feedback from the user associated with media content items that were previously played. For example, the interface displaying cards associated with categories, subcategories and media content items may include a "like" and "dislike" button. When the user likes or dislikes a category, sub-category or media content item, the user may select the appropriate button on the interface. The user's selection over time may be used to infer the user's preferences regarding media content and may be used as a factor by the machine learning model when making the decision 702.

In some examples, the listening context 710 may be used as a factor in making the decision 702. The listening context may include the vibe, beats, or energy level that would complement the user's current activity, mood or social context. In some examples, user may manually input data to indicate the current listening context 710. In other examples, the listening context 710 may be automatically predicted or inferred based on a variety of factors including, time of day, location of the media playback device 102, historical or current social media data related to the user or other factors. For example, based on the listening history, user preferences, user feedback, time of day, location of the media playback device 102, social media data, etc., the contextually relevant media content selection server application 186 may use a machine learning model to learn that the user prefers upbeat music in the morning when commuting and relaxing, jazz music around 6:00 PM when the user is at home eating dinner. The machine learning model may then use the current time of day and location of the media playback device 102 as factors when predicting whether a category, sub-category or media content item is contextually relevant. Other factors may also be used in making the decision 702.

The contextually relevant media content selection server application 186 may use the plurality of factors including, listening history of the user 704, user preferences from user profile 706, user feedback 708, and listening context 710 in determining a decision 702 regarding the selection of subset of categories, sub-categories and media content items and the selection of a particular media content item.

Figure 8:
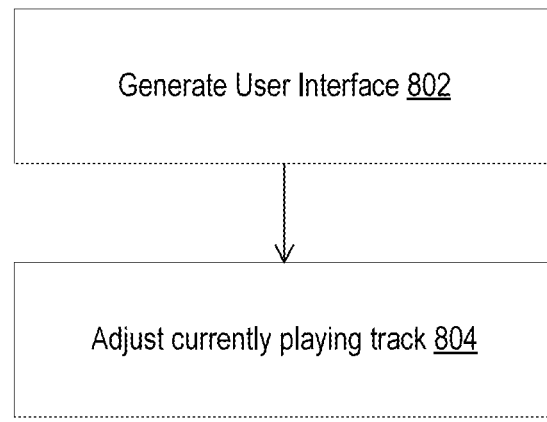
FIG. 8 illustrates an example method of the operation of the contextually relevant media content playback engine.

FIG. 8 illustrates an example method of the operation of the contextually relevant media content playback engine 108.

At operation 802, the contextually relevant media content playback engine 108 generates a user interface for the media playback device 102. The user interface may initially include a display of a plurality of cards, wherein each card may be associated with a category of media content items. Upon selection of a category card, the user interface may be updated to display a plurality of cards, wherein each card may be associated with a sub-category of media content items belonging to the selected category. Upon selection of a sub-category card, the user interface may be updated to display a plurality of media content items, wherein the plurality of media content items is associated with the selected sub-category card.

In some examples, the categories of media content items, sub-categories of media content items and list of media content items are the subset of categories, sub-categories, and media content items that were determined by the contextually relevant media content selection server application 186 and described further in detail in relation to FIGS. 5-6.

At operation 804, the contextually relevant media content playback engine 108 may adjust the currently playing media content item (the particular media content item described in operation 802), when the user interface receives a user input to start playback of a different media content item or when the user interface receives a user input to stop, pause or mute the playback of the currently playing media content item. The method of generating user interface and adjusting the playback of the currently playing media content item is described in further detail in relation to FIG. 9.

Figure 9:
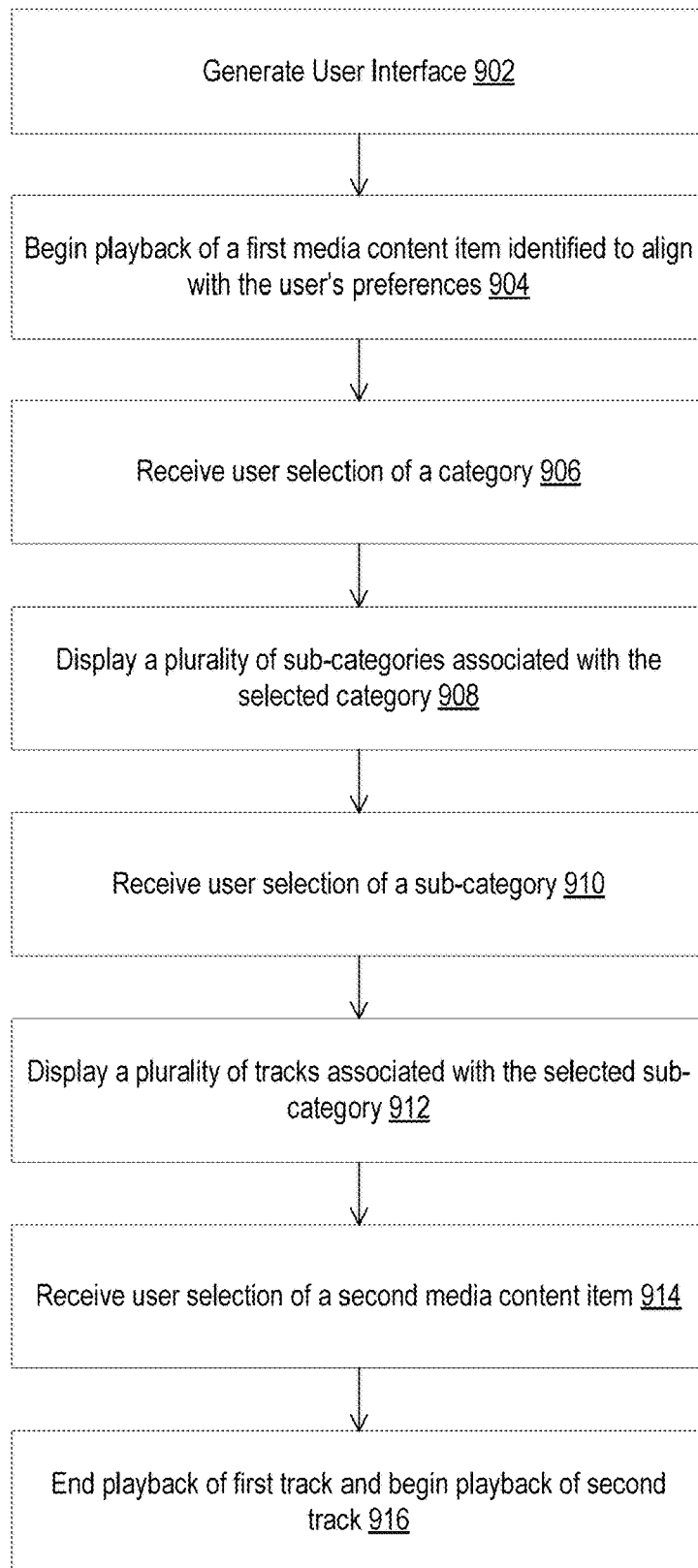
FIG. 9 illustrates another example method of the operation of the contextually relevant media content playback engine.

FIG. 9 illustrates another example method of the operation of the contextually relevant media content playback engine 108.

At operation 902, the contextually relevant media content playback engine 108 generates a user interface for the media playback device 102. In some examples, the contextually relevant media content playback engine 108 receives data regarding subsets of categories, sub-categories and media content items from the contextually relevant media content selection application interface 222 via a communication 236 over the network 106. Upon receiving the communication 236, the contextually relevant media content playback engine 108 uses the received data to generate a user interface that is displayed on the screen of the media playback device 102.

In some examples, the generated user interface includes a set of cards. Each of the set of cards is related to a category of media content item. Each of the cards may include a visual snippet associated with the underlying category. The visual snippet associated with a card may begin automatic playback as the user highlights the card. In some examples, the data associated with the visual snippet may be received by the contextually relevant media content playback engine 108 from the contextually relevant media content selection server application 186. The user interface and the elements displayed on the user interface are described in greater detail in relation to FIGS. 10-14.

At operation 904, the contextually relevant media content playback engine 108 begins playback of a first media content item identified to align with the user's preferences. The method of selecting the first media content item is described in greater detail in relation to FIGS. 5-7.

In some examples, in addition to the initial display of category cards on the user interface generated in operation 902, the contextually relevant media content playback engine 108 may also cause the playback of a particular media content item. The first media content item may be identified to align with the user's preferences by a machine learning model based on a plurality of factors at the contextually relevant media content selection server application 186.

For example, the data associated with the first media content item may be transmitted to the contextually relevant media content playback engine 108 via a communication 236 over the network 106. The contextually relevant media content playback engine 108, upon receiving the data associated with the first media content item causes the playback of the first media content on the media playback device 102 in association with the display of the user interface.

At operation 906, the media playback device 102 may receive a user selection of a category card on the user interface. In some examples, the media playback device 102 includes a touch screen display in which the user interface is displayed. The user may then be able to scroll through the plurality of category cards displayed on the user interface and select a card using a single touch tap on the user interface at the location where the category card of interest is displayed. Other types of user input are also possible.

At operation 908, upon receiving a selection of a category card from the user, the user interface updates to display a set of cards related to the sub-categories associated with the selected category card.

At operation 910, the media playback device 102 may receive a user selection of a sub-category card on the user interface. In some examples, the user may be able to scroll through the plurality of sub-category cards displayed on the user interface of the media playback device 102 and select a sub-category card using a touch input. Other types of user input are also possible.

At operation 912, upon receiving a selection of a sub-category card from the user, the user interface updates to display a list of media content items associated with the selected sub-category card.

At operation 914, the media playback device 102 may receive a user selection of a second media content item on the user interface, wherein the second media content item is different than the first media content item that began automatic playback after the user interface is generated in operations 902, 904.

At operation 916, the contextually relevant media content playback engine 108 may end the playback of the first media content item and begin the playback of the second media content item that was selected by the user in operation 914.

Figures 10A, 10B, 10C:
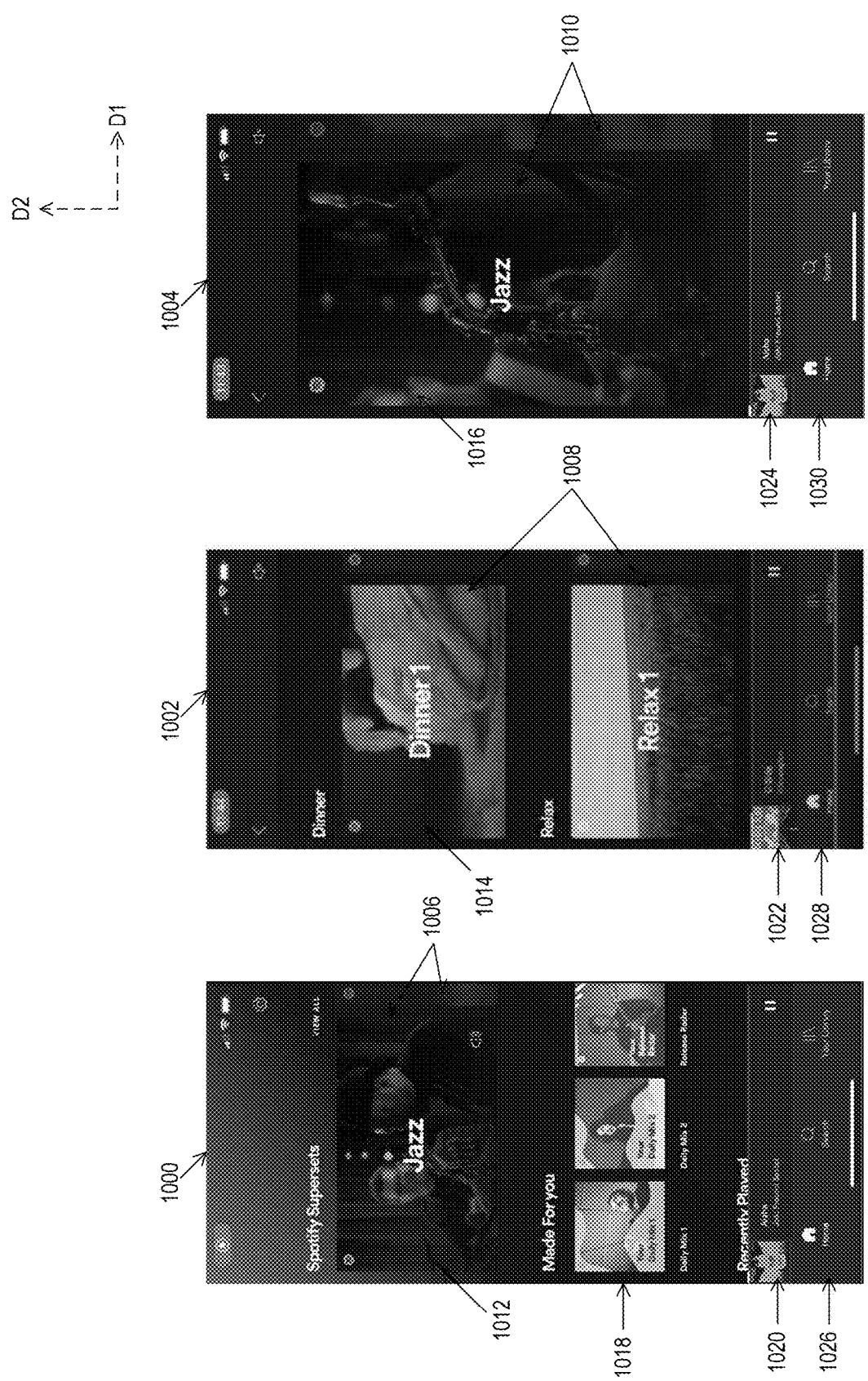
FIGS. 10A-C illustrate example category user interface screens generated by some embodiments of the contextually relevant media content playback engine.

FIGS. 10A-C illustrate example category user interface screens 1000, 1002, 1004, generated by some embodiments of the contextually relevant media content playback engine 108.

For example, the example category user interface screens 1000, 1002, 1004 each represent different configurations of the user interface screen generated by the contextually relevant media content playback engine 108 in response to receiving data regarding categories of media content items from the contextually relevant media content selection application interface 222.

The category user interface screens 1000, 1002, 1004 each present a different configuration of a plurality of category cards 1006, 1008, 1010 on a shelf or shelves that can be selected by the user to view sub-categories of contextually relevant media content items for playback. Upon the user selecting one of the plurality of category cards 1006, 1008, 1010, the category user interface screens 1000, 1002, 1004 update to the sub-category user interface screens described in greater detail in relation to FIGS. 11A-11B.

In some examples, the category cards 1006, 1010 may be arranged along the shelf in a first direction D1 (e.g., horizontal in case of category user interface screen 1000 of FIG. 10A or category user interface screen 1004 in case of FIG. 10C). In other examples, the category cards 1008 may be arranged along the shelf in a first direction D2 (e.g., vertical in case of category user interface screen 1002 of FIG. 10B).

In some examples, the category cards 1006, 1008, 1010 correspond to categories of media content items that each encompass a plurality of sub-categories where each sub-category further encompasses a playlist of media content items. In other words, the category cards 1006, 1008, 1010 correspond to supersets, each comprising a plurality of subsets, where each subset comprises a plurality of media content items.

In some examples, the media playback device 102 is configured to receive touch inputs to switch to a different card (e.g. belonging to a different category of media content items), in doing so, change the focus of the category user interface screen 1000, 1002, 1004 to the different card. For example, a swipe touch input that is primarily directed in a horizontal direction in the case of category user interface screens 1000, 1004 or that is primarily directed in a vertical direction in the case of the category user interface screen 1000 will change to a different card in the current shelf.

In some embodiments, the primary direction of a received swipe touch input is determined by comparing the vertical change to the horizontal change between the initial contact point for the swipe touch input and the final contact point for the swipe touch input and selecting the direction with a greater magnitude of change. Alternatively, the primary direction of a received swipe touch may be based on determining the primary direction (as described above) of a portion of the swipe touch input (e.g., a first portion of a predetermined duration, a middle portion of a predetermined duration, a final portion of a predetermined duration or by excluding an initial or final portion of a predetermined duration the swipe touch input).

The example category user interface screens 1000, 1002, 1004, include a currently selected shelf that displays graphical elements associated with the card(s) on the selected shelf, including a graphical element associated with a currently active card 1012, 1014, 1016.

In some examples, the graphical element associated with the currently active card 1012, 1014, 1016 may be an visual snippet that automatically plays when the currently active card 1012, 1014, 1016 is activated. In some examples, the video snippet may be played in a loop while the currently active card 1012, 1014, 1016 remains activated. The video snippet itself is related to the category associated with the activated card.

The display of a video snippet may aid the user in quickly understanding or getting a feel for the vibe, energy level, mood or activity related to the category of media content items associated with the activated card. For example, in FIG. 10A, the currently active card 1012 is related to the category of "Jazz." When the currently active card 1012 is activated, a video snippet of jazz musicians playing at a club may automatically play on a loop. In another example, in FIG. 10B, the currently active card 1014 is related to the category of "Dinner." When the currently active card 1014 is activated, a video snippet of a person kneading some pizza down may automatically play on a loop.

In some configurations, such as category user interface screen 1000, a shelf 1018 of playlist cards, personalized for the user may be listed. The user may select one or more of the pre-created playlists on the shelf 1018 by making a vertical swipe touch input from the currently active card 1012. The pre-created playlist cards may provide playlists personalized for the user based on the user's listening history.

In some examples, while the category user interface screen 1000, 1002, 1004 provides a display of cards related to categories of media content items, the contextually relevant media content playback engine 108 may also cause the automatic playback of a particular media content item that the contextually relevant media content selection server application 186 has identified to be contextually relevant.

The method of selecting the particular media content item is further described in relation to FIGS. 5-7.

For example, the category media playback control 1020, 1022, 1024 presents access for the user to control the playback of the currently playing media content item. For example, the category media playback control 1020, 1022, 1024 provides the name of the track, the name of the album and/or artist and a graphical element associated with the currently playing media content item. In addition, the category media playback control 1020, 1022, 1024 also includes a play/pause control option that allows the user to control the playback of the currently playing media content item. For example, the user may choose to play or pause the playback of the currently playing media content item by using a touch tap input.

In some examples, the category user interface screens 1000, 1002, 1004 may also include user controls 1026, 1028, 1030. In some examples, the user controls 1026, 1028, 1030 may include options for the user to navigate to the "home" user screen, "search" user screen and a "your library" user screen.

In one example, when the user selects the "home" user screen option on the user controls 1026, 1028, 1030, the category user interface screen 1000, 1002, 1004 may reset the category user interface screen 1000, 1002, 1004 such that shelves and cards on the user interface are reset to their initial positions. In another example, when the user selects the "search" user interface screen option on the user controls 1026, 1028, 1030, the category user interface screen 1000, 1002, 1004 may navigate to a search user interface screen where the user may search for a particular category, sub-category or media content item. In yet another example, when the user selects the "library" user interface screen option on the user controls 1026, 1028, 1030, the category user interface screen 1000, 1002, 1004, may navigate to a library user interface screen that includes the user's library of media content items, categories, sub-categories, playlists, etc. In other configurations of the user interface screen, other user controls may also be possible.

Figures 11A, 11B:
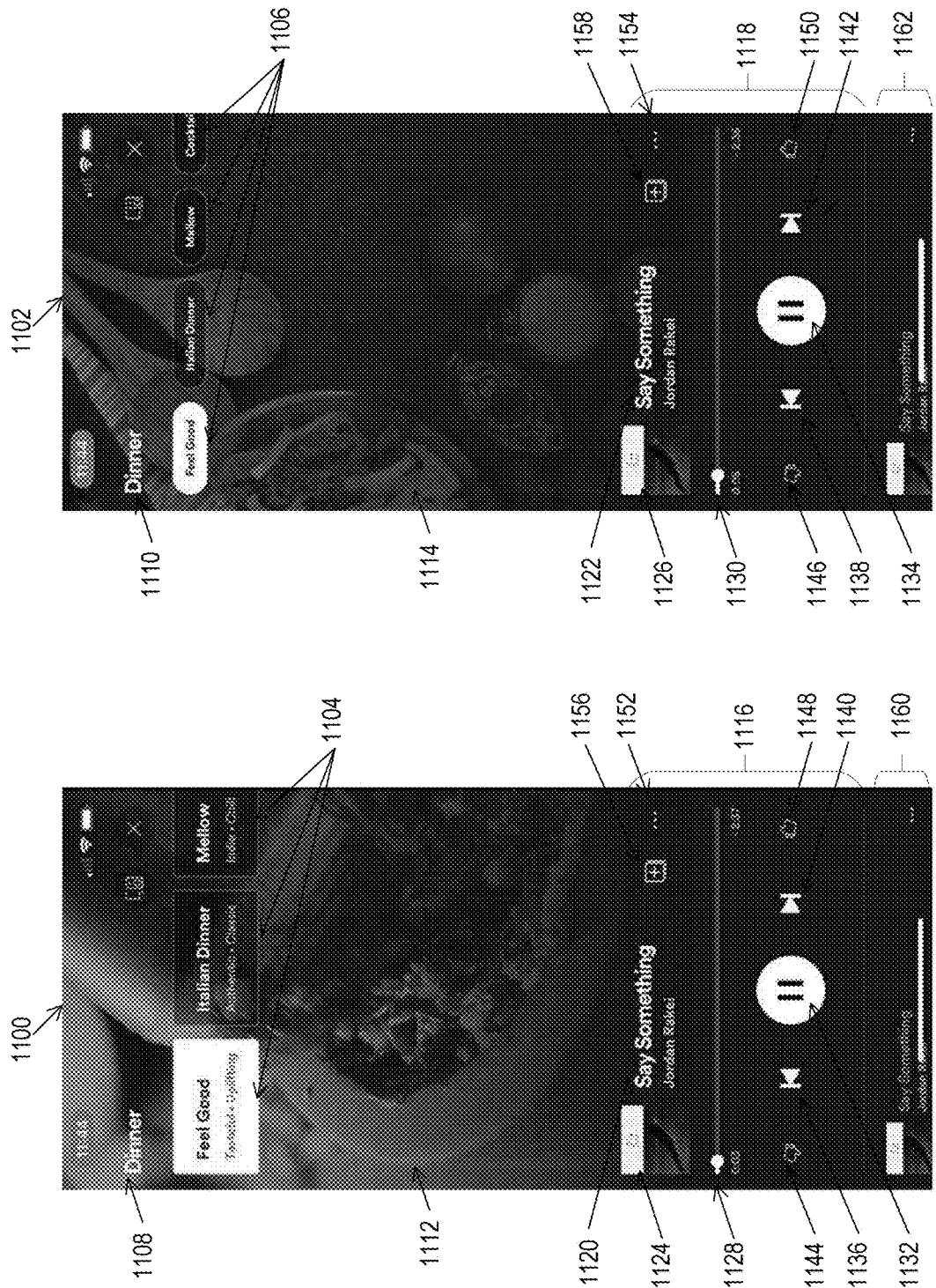
FIGS. 11A-B illustrate example sub-category user interface screens generated by some embodiments of the contextually relevant media content playback engine.

FIGS. 11A-B illustrate example sub-category user interface screens 1100, 1102, generated by some embodiments of the contextually relevant media content playback engine 108.

For example, the example sub-category user interface screens 1100, 1102 each represent different configurations of the user interface screen generated by the contextually relevant media content playback engine 108 in response to receiving data regarding sub-categories of media content items associated with the category that was selected by the user in the category user interface screen 1000, 1002, 1004. The data regarding the sub-categories of media content items is received from the contextually relevant media content selection application interface 222 through a communication 236 via a network 106.

The sub-category user interface screens 1100, 1102 each present a different configuration of a plurality of sub-category cards 1104, 1106 on a shelf that can be selected by the user to view contextually relevant media content items for playback. In some examples, the sub-category cards 1104, 1106 correspond to sub-categories of media content items that each encompass a plurality of media content items.

Figure 12:
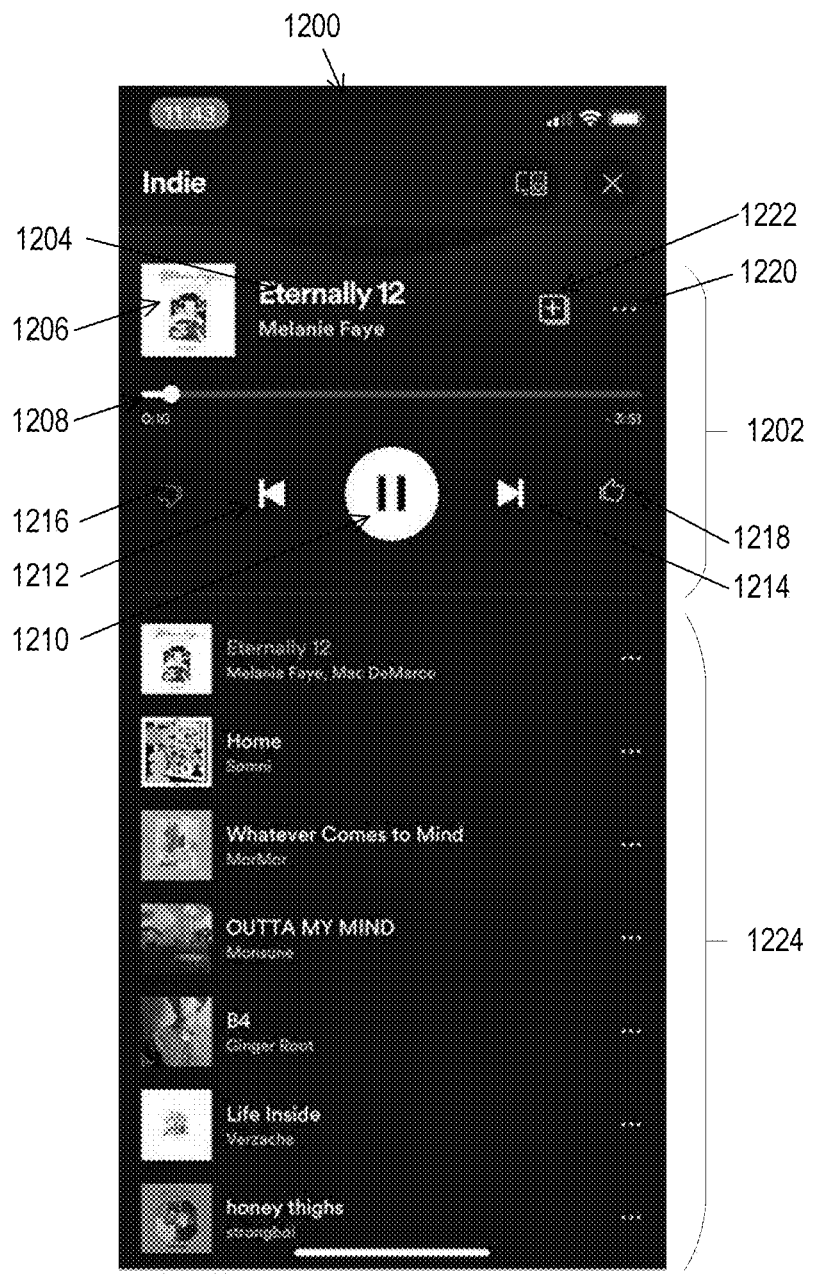
FIG. 12 illustrates an example media content item user interface screen generated by some embodiments of the contextually relevant media content playback engine.

Upon the user selecting one of the plurality of sub-category cards 1104, 1106, the sub-category user interface screens 1100, 1102 update to the media content user interface screens described in greater detail in relation to FIG. 12.

In some examples, the sub-category cards 1104, 1106 may be arranged along the shelf in a first direction D1 (e.g., horizontal in case of sub-category user interface screens 1100, 1102 of FIGS. 11A-B). In other examples, the sub-category cards 1104, 1106 may be arranged along the shelf in a second direction D2 (e.g., vertical in case of category user interface screen 1002 of FIG. 10B).

In some examples, the sub-category cards 1104, 1106 may include a title and descriptors on rectangular cards or include a simplified display with just the title and cards with rounded edges. Other types of configurations for the cards are also possible.

In the disclosed example, the sub-category card titles corresponding to a selection of the category card 1108, 1110 "Dinner" include: "Feel Good," "Italian Dinner," "Mellow," and "Cocktail Hour." For example, the sub-category cards 1104 also include descriptors that further describe the mood, vibe, of the sub-category itself. For example, the sub-category "Feel Good" is described as tasteful and uplifting, the sub-category "Italian Dinner" is described as authentic and classic and the sub-category "Mellow" is described as indie and chill.

In some examples, the sub-category user interface screens 1100, 1102 may include a display of graphical elements 1112, 1114 associated with the currently active sub-category cards 1104, 1106 on the background of the sub-category user interface screens 1100, 1102. For example, the background may stretch across the entire display screen of the media playback device 102, wherein the sub-category cards 1104, 1106, sub-category media playback controls 1116, 1118 and pre-compiled listing 1160, 1162 of media content items are overlaid on top of the background.

In some examples, the graphical elements 1112, 1114 may include a photo or picture related to the currently active sub-category card. In other examples, the graphical element may be an visual snippet that automatically plays when a sub-category card of the plurality of sub-category cards 1104, 1106 is activated. In some examples, the video snippet may be played in a loop while the currently active sub-category cards 1104, 1106 remains activated. The video snippet itself is related to the sub-category associated with the activated card.

In some examples, the sub-category media playback controls 1116, 1118 includes controls for the user to control the playback of the currently playing media content item. For example, as described in relation to FIGS. 10A-C, a particular media content item begins automatic playback in conjunction with the display of the category user interface screens 1000, 1002, 1004. In some examples, the particular media content item continues playback until the user either stops the playback or selects a different media content item. In some other examples, the playback of the particular media content item continues as the user swipes through the different category cards 1006, 1008, 1010 and sub-category cards 1104, 1106. In some other examples, other types of playback configurations are also possible.

For example, the sub-category media playback controls 1116, 1118 includes the name and artist associated with the currently playing media content item 1120, 1122 and a graphical element associated with the currently playing media content item 1124, 1126. In some examples, the graphical element associated with the currently playing media content item 1120, 1122 may include an album cover, cover art or other photo or picture associated with the currently playing media content item. In other examples, other types of graphical elements are also possible.

In some examples, the sub-category media playback controls 1116, 1118 may further include a progress bar 1128, 1130 to indicate the progress associated with the playback of the currently playing media content item, a pause/play option 1132, 1134 that allows the user to select to pause or continue playback of the currently playing media content item, skip backward 1136, 1138 and skip forward buttons 1140, 1142 that allow the user to skip to the previous or next media content item within the plurality of media content items associated with the currently active sub-category card.

In some examples, the sub-category media playback controls 1116, 1118 may further include a dislike option 1144, 1146 and a like option 1148, 1150 that allows the user to provide user feedback regarding the currently playing media content item. For example, the user may select the dislike option 1144, 1146 when the currently playing media content item is not aligned with the user's preferences and the user may select the like option 1148, 1150 when the currently playing media content item is aligned with the user's preferences.

In some examples, upon receiving a selection associated with the dislike option 1144, 1146 or the like option 1148, 1150, the media playback engine 170 may send the received selection information to the media-delivery system 104 to be included with the media content metadata 214 of the currently playing media content item, where the selection is used to inform the selection of a media content item for future playback as described further in relation to FIG. 7.

In some examples, the sub-category media playback controls 1116, 1118 may include an "additional options" button 1152, 1154 that when selected by the user provides the user with additional options related to the currently playing media content item. For example, selecting the "additional options" button 1152, 1154 may provide the user with options to view the artist name, album name, similar artists, view other media content items related to the same album or artist, or share the media content item with other users. Other types of additional options related to the currently playing media content item may also be possible.

In some examples, the sub-category media playback controls 1116, 118 may also include an "add media content items" option 1156, 1158 that may be selected by the user to add additional media content items to the pre-compiled listing 1160,1160 of media content items, described below in detail.

In some examples, the sub-category user interface screens 1100, 1102 may also include a pre-compiled listing 1160, 1162 of media playback items associated with the currently activated sub-category. The user may be able to scroll through the pre-compiled listing 1160, 1162 of media playback items by using a vertical swipe touch input. The pre-compiled listing 1160, 1162 may include a plurality of media content items that correspond to the selected subset of media content items that are associated with the currently activated sub-category and selected by the contextually relevant media content selection server application 186 as being aligned with the user's taste profile as described in relation to FIGS. 5-7.

FIG. 12 illustrates an example media content item user interface screen 1200 generated by some embodiments of the contextually relevant media content playback engine 108.

For example, the example media content item user interface screen 1200 represents a configuration of the user interface screen generated by the contextually relevant media content playback engine 108 in response to receiving data regarding a subset of contextually relevant media content items from the contextually relevant media content selection application interface 222 as described further in relation to FIGS. 5-7.

In some examples, the media content item user interface screen 1200 may include media content item playback controls 1202 and a listing of media content items 1224. For example, upon the user selecting one of the plurality of sub-category cards on sub-category user interface screens 1100, 1102, the contextually relevant media content playback engine 108 may cause the display of the media content item user interface screen 1200 on the media playback device 102 based on the data received from the contextually relevant media content selection application interface 222 via communication 236 through network 106.

For example, the media content item playback controls 1202 includes the name and artist associated with the currently playing media content item 1204 and a graphical element associated with the currently playing media content item 1206. In some examples, the graphical element associated with the currently playing media content item 1206 may include an album cover, cover art or other photo or picture associated with the currently playing media content item. In other examples, other types of graphical elements are also possible.

In some examples, the media content item playback controls 1202 may further include a progress bar 1208 to indicate the progress associated with the playback of the currently playing media content item, a pause/play option 1210 that allows the user to select to pause or continue playback of the currently playing media content item, skip backward 1212 and skip forward buttons 1214 that allow the user to skip to the previous or next media content item within the listing of media content item 1224 associated with the currently active sub-category card.

In some examples, the media content item playback controls 1202 may further include a dislike option 1216 and a like option 1218 that allows the user to provide user feedback regarding the currently playing media content item. For example, the user may select the dislike option 1216 when the currently playing media content item is not aligned with the user's preferences and the user may select the like option 1218 when the currently playing media content items is aligned with the user's preferences.

In some examples, upon receiving a selection associated with the dislike option 1216 or the like option 1218, the media playback engine 170 may send the received selection information to the media-delivery system 104 to be included with the media content metadata 214 of the currently playing media content item, where the received selection may be used to inform the selection of a media content item for future playback as described further in relation to FIG. 7.

In some examples, the media content item playback controls 1202 may include an "additional options" button 1220 that when selected by the user provides the user with additional options related to the currently playing media content item. For example, selecting the "additional options" button 1220 may provide the user with options to view the artist name, album name, similar artists, view other media content items related to the same album or artist, or share the media content item with other users. Other types of additional options related to the currently playing media content item may also be possible.

In some examples, the media content item playback controls 1202 may also include an "add media content items" option 1222 that may be selected by the user to add additional media content items to the pre-compiled listing of media content items 1224, described below in detail.

In some examples, the media content item user interface screen 1200 may also include a listing of media content items 1224 associated with the currently active sub-category cards 1104, 1106, from sub-category user interface screens 1100, 1102. The user may be able to scroll through the listing of media content items 1224 of media playback items by using a vertical swipe touch input. The listing of media content items 1224 may include a plurality of media content items that correspond to the selected sub-category from the sub-category user interface screens 1100, 1102 and selected by the contextually relevant media content selection server application 186 as being aligned with the user's taste profile as described in relation to FIGS. 5-7.

In some examples, a tap touch input over a media content item listed on the listing of media content items 1224 may result in the contextually relevant media content playback engine 108 causing the display of additional playback options on the media content item user interface screen 1200. The user may select one or more options on the additional playback options to cause the playback of the currently playing media content item to stop and to cause the playback of the newly selected media content item as further described in relation to FIGS. 8-9.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of presenting one or more media content items to a user, the method comprising:
   identifying a plurality of categories of media content;
   selecting a subset of the plurality of categories of media content, wherein the subset of the plurality of categories includes one or more categories that are selected for the user based on one or more user preferences;
   identifying a plurality of subcategories associated with a particular category of the one or more categories;
   selecting a particular subcategory from the plurality of subcategories based on the one or more user preferences;
   identifying a plurality of media content items associated with the particular subcategory;
   selecting a particular media content item from the plurality of media content items based on the one or more user preferences;
   presenting the subset of the plurality of categories in a user interface, including the particular category, for selection by the user; and causing playback of the particular media content item and a visual snippet associated with the particular category played in a loop while the subset of the plurality of categories are presented in the user interface.

2. The method of claim 1, further including:
   receiving a selection of a category from among the plurality of categories;
   selecting a subset of the plurality of subcategories, including one or more sub categories of the selected category;
   presenting the subset of the plurality of subcategories in the user interface;
   receiving a selection of one of the subcategories of the subset of the plurality of subcategories;
   identifying a plurality of media content items associated with the selected subcategory;

selecting a subcategory media content item from the plurality of media content items associated with the selected subcategory; and playing the subcategory media content item while the selected subcategory is presented in the user interface.

3. The method of claim 1, further including:

while the particular category is selected on the user interface, playing a video associated with the particular subcategory.

4. The method of claim 3, wherein the video associated with the particular subcategory is personalized to the user based on a profile of the user.

5. The method of claim 1, wherein a machine learning model is used to select the subset of the plurality of categories of media content, the particular subcategory and the particular media content item.

6. The method of claim 5, wherein the subset of the plurality of categories of media content, the particular subcategory and the particular media content item are selected by the machine learning model to align with a listening context.

7. The method of claim 1, further comprising:

presenting, on the user interface, a user-selectable option for liking or disliking the particular media content item.

8. The method of claim 1, further comprising:

presenting, on the user interface, a user-selectable option for skipping the playback of the particular media content item.

9. The method of claim 1, wherein the one or more user preferences includes at least one of: listening history, taste preferences or user feedback.

10. A non-transitory computer-readable storage device storing data instructions, which when executed by a processor, cause the processor to:

identify a plurality of categories of media content;

select a subset of the plurality of categories of media content, wherein the subset of the plurality of categories includes one or more categories that are selected for a user based on one or more user preferences;

identify a plurality of subcategories associated with a particular category of the one or more categories;

select a particular subcategory from the plurality of subcategories based on the one or more user preferences;

identify a plurality of media content items associated with the particular subcategory;

select a particular media content item from the plurality of media content items based on the one or more user preferences;

present the subset of the plurality of categories in a user interface, including the particular category, for selection by the user; and cause playback of the particular media content item and a visual snippet associated with the particular category played in a loop while the subset of the plurality of categories are presented in the user interface.

11. The non-transitory computer-readable storage device of claim 10, wherein the data instructions when executed by the processor further cause the processor to:

receive a selection of a category from among the plurality of categories;

select a subset of the plurality of subcategories, including one or more sub categories of the selected category;

present the subset of the plurality of subcategories in the user interface;

receive a selection of one of the subcategories of the subset of the plurality of subcategories;

identify a plurality of media content items associated with the selected subcategory;

select a subcategory media content item from the plurality of media content items associated with the selected subcategory; and play the subcategory media content item while the selected subcategory is presented in the user interface.

12. The non-transitory computer-readable storage device of claim 10, wherein the data instructions when executed by the processor further cause the processor to:

while the particular category is selected on the user interface, play a video associated with the particular subcategory.

13. The non-transitory computer-readable storage device of claim 12, wherein the video associated with the particular subcategory is personalized to the user based on a profile of the user.

14. The non-transitory computer-readable storage device of claim 10, wherein a machine learning model is used to select the subset of the plurality of categories of media content, the particular subcategory and the particular media content item.

15. The non-transitory computer-readable storage device of claim 14, wherein the subset of the plurality of categories of media content, the particular subcategory and the particular media content item are selected by the machine learning model to align with a listening context.

16. The non-transitory computer-readable storage device of claim 10, wherein the data instructions when executed by the processor further cause the processor to:

present, on the user interface, a user-selectable option for liking or disliking the particular media content item.

17. The non-transitory computer-readable storage device of claim 10, wherein the data instructions when executed by the processor further cause the processor to:

present, on the user interface, a user-selectable option for skipping the playback of the particular media content item.

18. The non-transitory computer-readable storage device of claim 10, wherein the one or more user preferences includes at least one of: listening history, taste preferences or user feedback.

19. A computer system including:

one or more processors; and memory storing one or more programs, which, when executed by the one or more processors, cause the computer system to:

identify a plurality of categories of media content;

select a subset of the plurality of categories of media content, wherein the subset of the plurality of categories includes one or more categories that are selected for a user based on one or more user preferences;

identify a plurality of subcategories associated with a particular category of the one or more categories;

select a particular subcategory from the plurality of subcategories based on the one or more user preferences;

identify a plurality of media content items associated with the particular subcategory;

select a particular media content item from the plurality of media content items based on the one or more user preferences;

present the subset of the plurality of categories in a user interface, including the particular category, for selection by the user; and cause playback of the particular media content item and a visual snippet associated with the particular category played in a loop while the subset of the plurality of categories are presented in the user interface.

20. The computer system of claim 19, wherein the one or more programs further cause the computer system to:
receive a selection of a category from among the plurality of categories;
select a subset of the plurality of subcategories, including one or more subcategories of the selected category;
present the subset of the plurality of subcategories in the user interface;
receive a selection of one of the subcategories of the subset of the plurality of subcategories;
identify a plurality of media content items associated with the selected subcategory;
select a subcategory media content item from the plurality of media content items associated with the selected subcategory; and
play the subcategory media content item while the selected subcategory is presented in the user interface.

* * * * *